INVENTORS
Frank D. Wampler
Howard E. Smith
John E. Marman
BY Carl A. Stichel
THEIR ATTORNEY Feb. 11, 1964    F. D. WAMPLER ET AL    3,121,024
ELECTROSTATIC PAINTING APPARATUS
Filed March 22, 1960    7 Sheets-Sheet 4

INVENTORS
Frank D. Wampler
Howard E. Smith
John E. Marman
BY
Carl A. Stickel
THEIR ATTORNEY INVENTORS
Frank D. Wampler
Howard E. Smith
John E. Marman
BY
Carl A Stickel
THEIR ATTORNEY

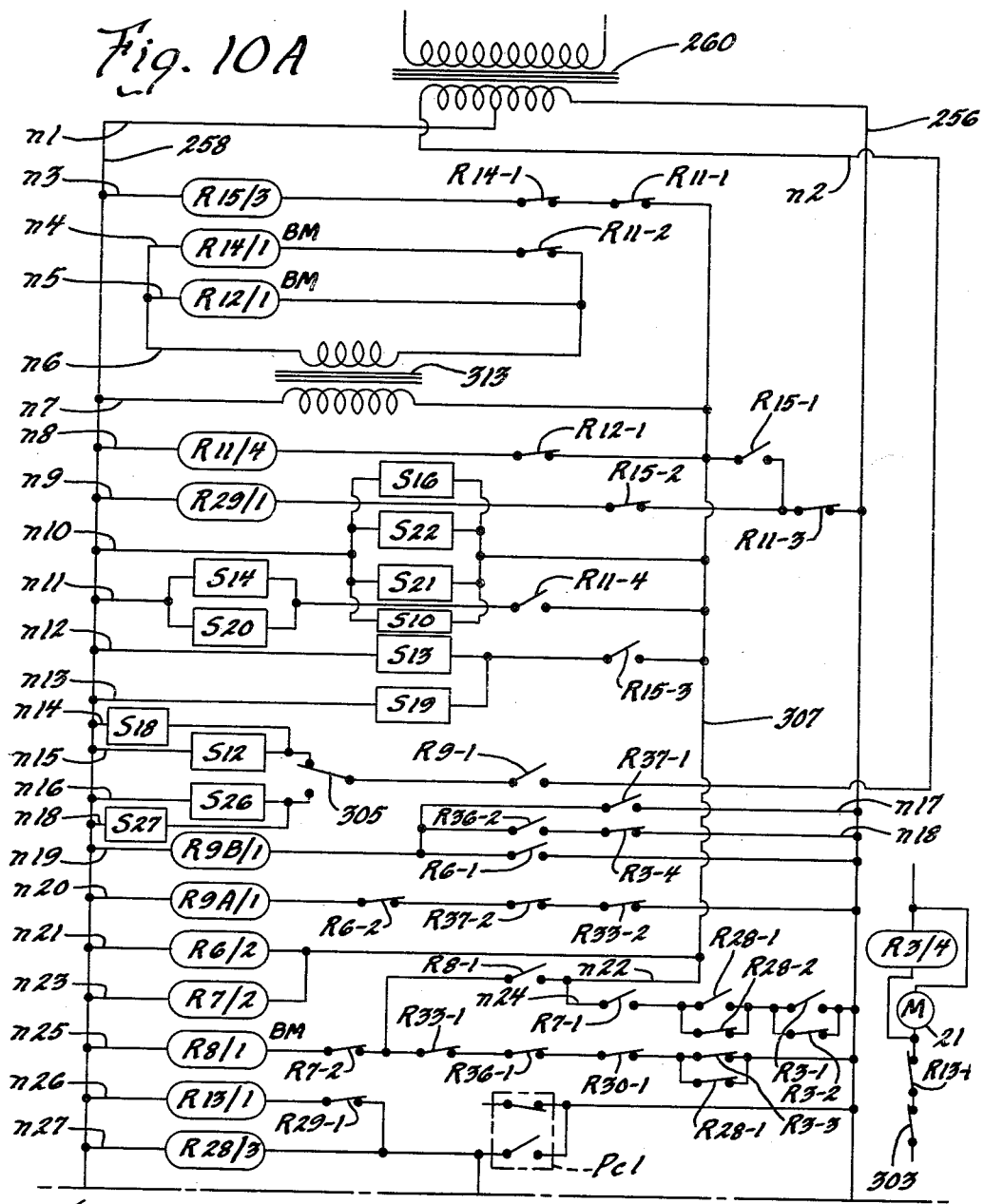

KEY:
LS1 – LIMIT SWITCH-1
C1 – CAPACITOR 1
Pc1 – PHOTOELECTRIC CELL 1

INVENTORS
Frank D. Wampler
Howard E. Smith
John E. Marman
BY Carl A. Stichel
THEIR ATTORNEY United States Patent Office 3,121,024
Patented Feb. 11, 1964

3,121,024
ELECTROSTATIC PAINTING APPARATUS
Frank D. Wampler, Brookville, and Howard E. Smith and John E. Marman, Dayton, Ohio, assignors to General Motors Corporation, Detroit, Mich., a corporation of Delaware
Filed Mar. 22, 1960, Ser. No. 16,786
13 Claims. (Cl. 118—2)

This invention relates to electrostatic painting apparatus and more particularly to apparatus for applying paint coatings of greater density and uniformity without bubbles or blemishes.

The electrostatic application of paint is used to eliminate hand spraying operations and minimize the waste of paint and provide higher production. While considerable improvement in painting has been achieved through electrostatic apparatus, further improvements is desirable.

It is an object of the invention to provide a paint spray feed and rotatable container which will distribute the paint more uniformly with a heavier coat upon the surface to be painted.

It is another object of the invention to automatically shut off the supply of paint and to flush the paint spray device whenever there is a predetermined delay in the presentation of surfaces to be painted.

It is another object of this invention to provide an electrostatic paint spraying system in which the paint supply passages can be rapidly cleaned in a short time with a minimum of effort to prevent the mixing of various colors of paint when changing from one color to another.

It is another object of this invention to automatically maintain the proper distance between the paint spray device and the surface to be painted regardless to different distances between the surface painted and the conveyor thereof.

It is another object of this invention to provide a paint distributing system so arranged that the atmosphere is prevented from contacting and hardening the paint so that the paint will not be exposed until it is being centrifuged upon a revolving container.

It is another object of this invention to provide a paint distributing system in which the length of time that the paint is exposed to the atmosphere before it is deposited upon the surface to be painted is kept at a minimum.

It is another object of this invention to provide an electrostatic paint spraying system which can readily be changed from one paint to another rapidly without any mixing of one paint with the other.

These and other objects are attained in the preferred form shown in the drawings by providing a paint spray coating system in which a separate inlet is provided for each of two different supplies of a paint coating material, each provided with a shut-off valve. A third inlet is provided for thinner and air, also with a shut-off valve. An outlet passage is provided to the paint spray container and another outlet is provided as a waste discharge which is provided with a shut-off valve. In the paint spray system shown, two identical spray coating containers and paint supply systems are provided, but any number may be used, if desired.

For delivering the paint, the discharge to the paint spray container extends upwardly through the center of a stationary shaft which connects to a distributor located in a recess in the central portion of the rotatable paint spray container. This distributor is in the shape of an inverted cone and has its lower edge located just four thousandths of an inch above the surface of the recess of the container. This distributor has an annular distributing passage provided between two converging cone shaped surfaces which prevents more paint from being fed beneath the lower edge of the distributor to the container than it can use to best advantage. The close spacing of the rim of the distributor above the surface of the recess insures substantially uniform flow into the rotating container. The central recess of the container is flanged by an upwardly flared cone shaped portion having an angle of about 14° which terminates in an upwardly curled rim in the form of a smooth ½ inch radius terminating with a 14° edge which meets a vertical periphery to provide a sharp edge.

To deliver the paint, this container is rotated at speeds from about three to four thousand r.p.m. In the specific example shown, two of these rotating containers are located in staggered relation about four feet apart and about four inches on opposite sides of the center of the path of movement of the articles to be painted. The work moves parallel to the center line with the surface to be painted suspended about ten inches above the rims of the containers. The containers are automatically raised and lowered to three different positions to maintain this distance.

The conveyor carrying the work over the containers and the paint spray containers themselves are connected to opposite terminals of a high voltage supply having a voltage of 110,000 volts. The opposite charges thus applied to the paint and the surface to be painted causes the paint sprayed by centrifuging from the rim of the container to be attracted to the surface to be painted so that substantially no paint is wasted. This form of container causes the paint to be thinned uniformly as it flows over the cone shaped 17° portion and to be thickened at the curled rim so that a very dense uniform coating without bubbles or blemishes is applied to the surface to be painted by this apparatus. If desired, an air ring with discharge nozzles directed upwardly may be used to shrink and direct the pattern of the paint spray. The valves preferably are operated by air pressure which in turn preferably is controlled by three way solenoid valves under the control of an electrical system which will automatically shut off the paint supply and flush the system with solvent of thinner and air or gas if there is an interruption of more than two minutes in the presentation of surfaces to be painted.

Further objects and advantages of the present invention will be apparent from the following description, reference being had to the accompanying drawings wherein preferred embodiments of the present invention are clearly shown.

In the drawings:

FIGURES 10A and 10B together are a wiring diagram of the automatic control system for the apparatus with the adjoining parts being duplicated to show the continuity.

Figure 1:
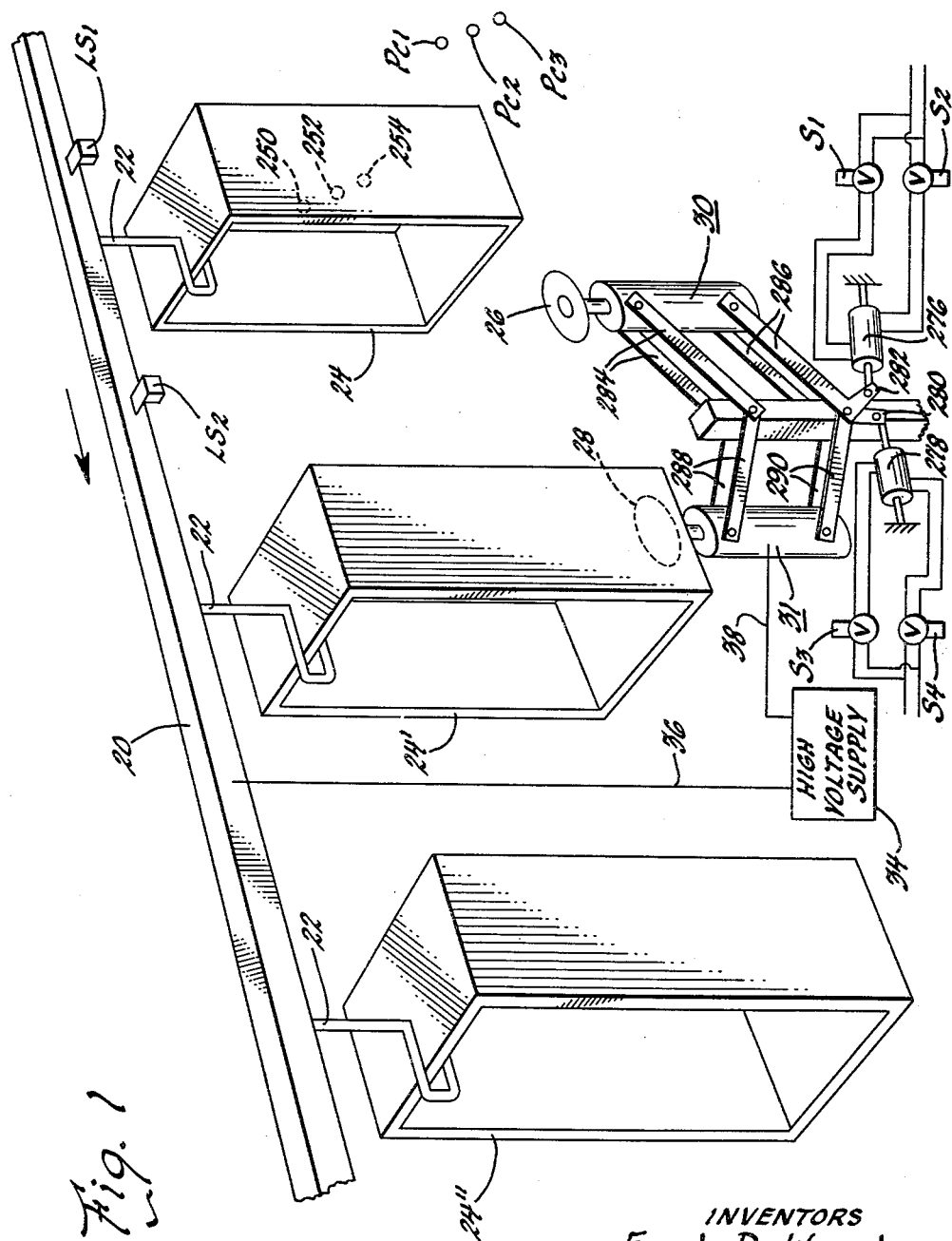
FIGURE 1 is a diagrammatic representation of a conveyorized electrostatic paint spraying apparatus and system embodying one form of my invention.
Figure 2:
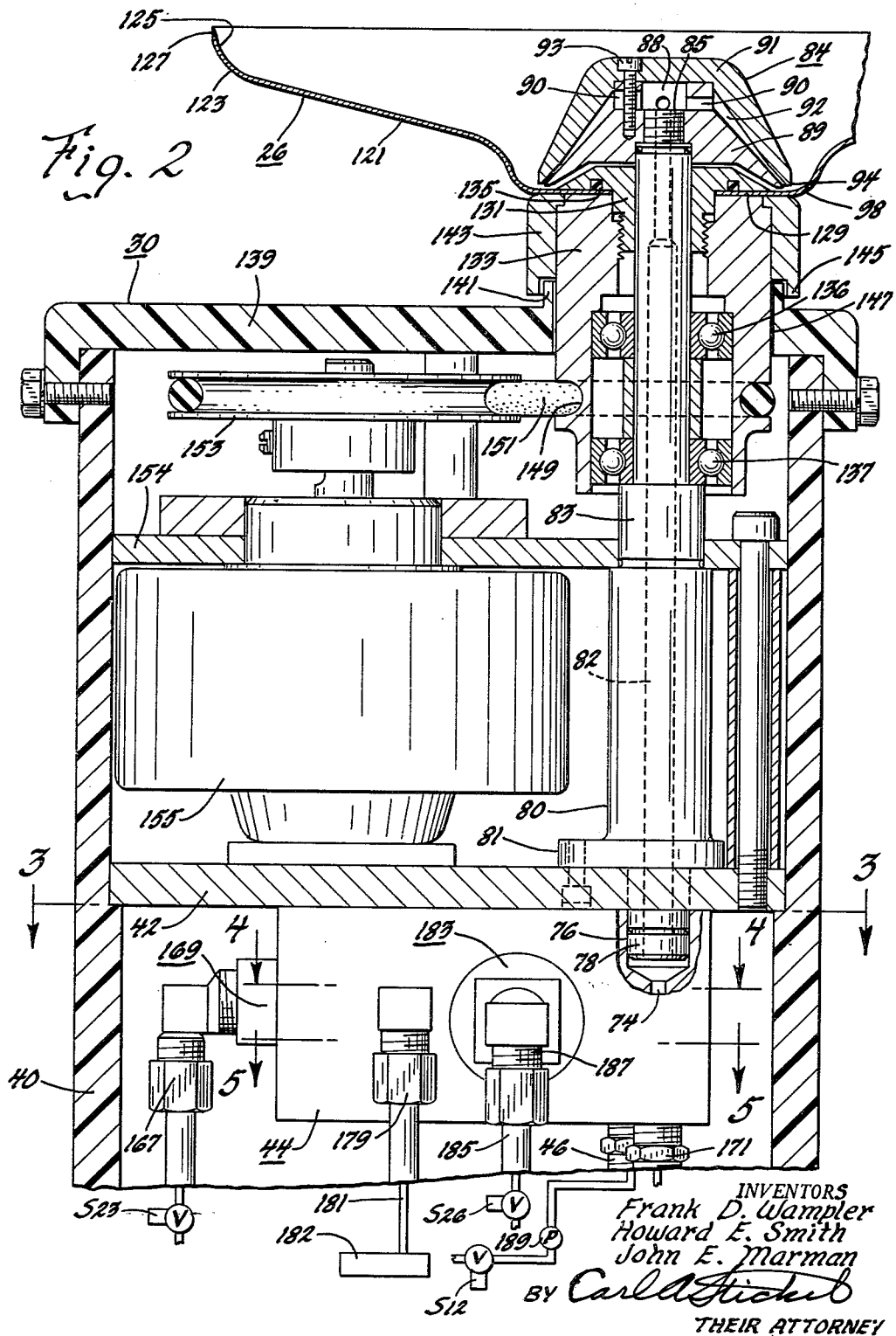
FIGURE 2 is an enlarged vertical sectional view of one of the paint spraying devices.

Referring now to the drawings and more particularly to FIGURE 1, there is shown diagrammatically an overhead conveyor 20 having depending hook-shaped supports 22 which support the similar cabinet shells 24, 24′ and 24″. These supports 22 are normally spaced four feet apart but sometimes are spaced six feet apart or four feet eight inches apart. The conveyor 20 by an electric motor 21 (FIGURE 10A) moves the supports 22 and the short, medium and long cabinet shells 24, 24′ and 24″ from the right to the left above the identical paint spraying containers 26 and 28 which are rotated at speeds of three to four thousand r.p.m. by the apparatus within the housings 30 and 31. The paint delivery containers 26 and 28 are located four feet apart in staggered relation with their centers about four inches on opposite sides of the center line of the cabinets. A high voltage supply 34 of 110,000 volts D.C. has one terminal connected by the conductor 36 to the conveyor 20 and has a second terminal connected by the conductor 38 to the metal parts within the housings 30 and 31 which are electrically connected to the containers 26 and 28. The relative locations of the containers 26 and 28 may vary considerably. The supply 34 may vary from 90,000 to 125,000 volts.

Figure 7:
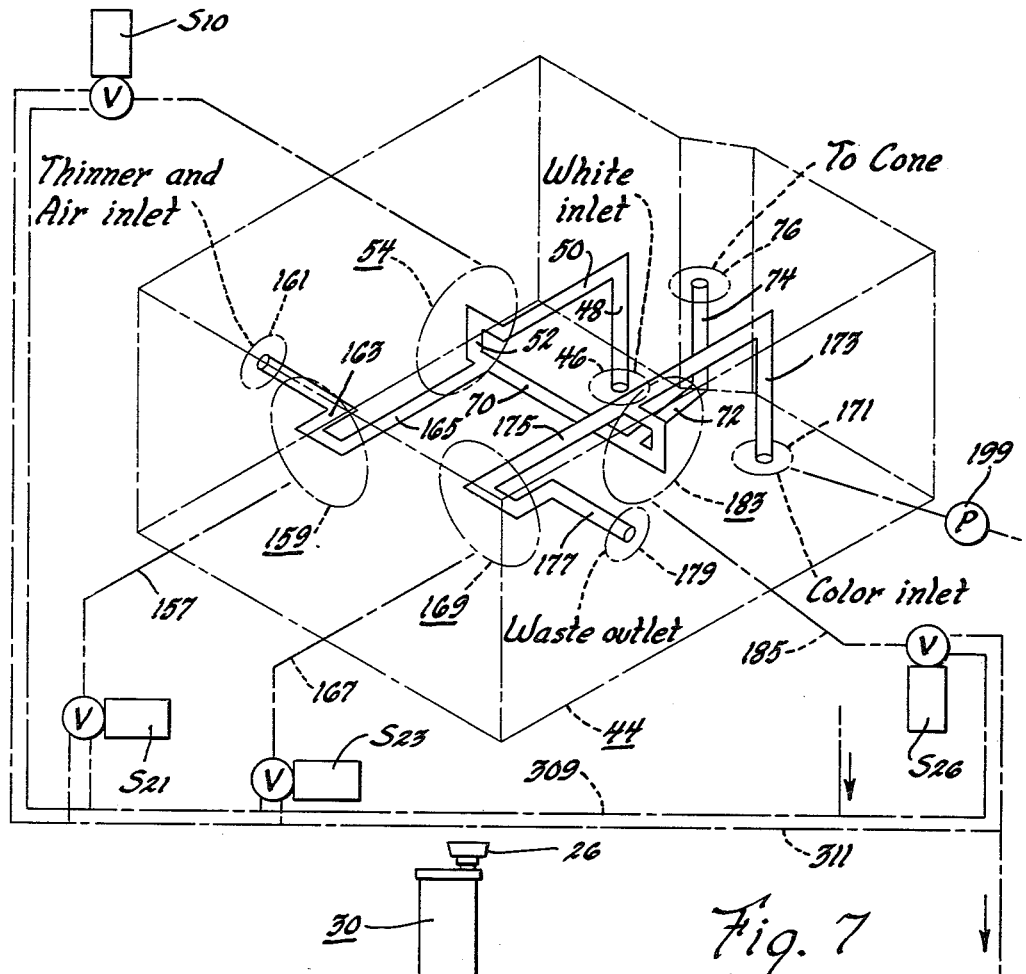
FIGURE 7 is a diagrammatic isometric view, partly in phantom, of the passages in the control block.

The housing 30 and its contents are identical to the housing 31 and its contents and includes a cylindrical portion 40 of polyvinyl chloride or other electrical insulating material. This cylindrical housing portion 40 is provided with a shoulder supporting the transverse metal plate 42 which beneath it carries the aluminum valve and passage block 44. As shown best in FIGURES 3, 4 and 7, the first paint intake connection 46 is in the form of a nipple normally connected through a solenoid valve S12 to a source of white paint coating material or any other paint which may be designated as the No. 1 paint coating material. This connects to an upwardly extending passage 48 and a horizontal passage 50 at an upper level with a U-shaped valve passage 52. The U-shaped passage 52 is a part of a valve arrangement 54 operated by air pressure from the connection 56.

Each of the four valves and air connections in the block 44 are similar. Each is controlled by a three way solenoid valve which when deenergized connects the air pressure supply 309 to the air connection with the valve and when the three way solenoid valve is energized it connects the air connection with the air exhaust line 311. Each is in the form of a cylindrical recess 58 having a threaded plug 60 receiving the threaded elbow air connection, such as the connection 56. The recess also includes a shallow central depression 62 forming the yoke portion of the U-shaped passage 52 surrounded by a raised shoulder 64. The raised shoulder 64 carries a polyethylene disk 66 which is held against the shoulder by a brass disk 68 having a central aperture and a recess or depression similar to the depression 62 facing the polyethylene disk 66. The opposite face of the brass disk 68 is provided with a coaxial concave flared entrance to the central aperture which fits against the rounded adjacent end of the threaded plug 60 creating an equal pressure on the edges of the polyethylene disk 66.

The application of air pressure to the connection 56 and the plug 60 causes the polyethylene disk 66 to be forced into the depression 62 so as to collapse and close the yoke portion of the U-shaped passage arrangement 52 to prevent the entrance of the paint. When the air pressure is relieved, the paint coating material will flow through the depression 62 to the transverse passage 70 at the lower level which connects with the branch passage 72 connecting with a vertical passage 74 extending upwardly. The block 44 has a recess 76 in its upper face connecting with the passage 74 and receiving the projection 78 at the lower end of the stationary shaft 80. The stationary shaft 80 has a flange 81 resting upon the plate 42 which has an aperture aligned with the recess 76 through which extends the projection 78 into the recess 76. The stationary shaft 80 includes a central paint delivery passage 82 extending upwardly to the interior of a closed top distributing head 84 which is threaded onto its reduced upper end portion 85. The intermediate portion of the shaft 80 is provided with a shoulder 83 fitting within an aperture in the transverse plate 154 within the cylinder 40. Above the shoulder 83, the upper end of the shaft 80 is reduced in diameter and its upper portion includes a reduced upper section of the passage 82.

The paint delivery distributing head 84 includes a central recess 88 which is closed at the top and open at the bottom for receiving paint from the passage 82. From the recess 88, there extend horizontally three large and nine small passages 90 at an angle of about 47°. The passages 90 end in the converging conical passage 92 which terminates at the rim 94 of the distributing head. The distributing head 84 is formed of an inner cone shaped member 89 threaded directly on the upper end portion 85 and having an outer surface at an angle of 43° to its axis. The outer cone shaped member 91 seats upon the cylindrical top of the member 89 and has an inner cone shaped surface at an angle of 36° to its axis except for the lowest ⅛ inch which is at an angle of 43°. Three screws 93 extend through the top of the member 91 and thread into the inner member 89, passing through the three large passages 90 to fasten the member 91 to the member 89. The cylindrical top of the member 89 spaces the converging conical inner and outer surfaces of the members 91 and 89 forming the converging conical passage 92 so that the 43° conical surfaces near the rim 94 are spaced apart only 0.003 inch. This 0.003 inch gap restricts the flow of paint sufficiently to prevent flooding under the member 89 with excess paint and insures equal flow throughout the periphery. The raised center of the screw or gland 131 prevents paint from running down the shaft 80. The rim 94 of the member 91 is located 0.001 inch above the bottom of the member 89 and about 0.004 inch above the bottom of the recess 98 to provide a restriction to flow sufficient to provide a uniform outward radial flow of paint into the recess 98. The paint delivering recess 98 is connected by an ogee curve having radii of ¼ inch and ½ inch to a widely flared paint delivering flange portion 121 extending at an angle of about 14° outwardly and upwardly. The extreme edge of this cone shaped flange portion 121 is provided with a curled rim 123 of one half inch radius terminating in an inside annular surface 125 extending at an angle of 14° with the vertical. The outer edge portion 127 is sharply beveled or chamfered to provide a sharp vertical edge. The inside of the container 26 is polished.

The paint container coating device has an outer diameter of eight inches and is one and a half inches high. The bottom surface of the recess 98 is two and three-sixteenths inches in diameter. The cone shaped portion 121 has its theoretical apex ⁵⁄₃₂ of an inch above the center of the bottom portion 129 of the recess 98. The outer edge has an included angle of 14°. The contour provides the best paint distribution. The bottom of the paint delivery container 26 has a central aperture which receives the shank of a large headed screw 131 which is threaded into a sleeve 133. The head of the screw 131 clamps the bottom portion 129 of the container 26 between it and the sleeve 133. The head of the screw 131 is provided with an annular recess containing the annular gasket 135 which seals with the adjacent surface of the container so as to prevent the escape of paint.

The sleeve 133 is mounted upon the upper and lower ball bearings 136 and 137 which are mounted upon the stationary shaft 80. The cylinder 40 is provided with a top 139 of polyethylene having an upwardly extending flange 141 surrounding the sleeve 133. A collar 143 is mounted on the sleeve 133 and has a downwardly extending flange 145 surrounding the flange 141 to prevent the entrance of paint into the opening 147 in the top 139 surrounding the sleeve 133. The sleeve 133 is provided with a pulley groove 149. A round belt 151 extends through the pulley groove 149 and connects with a larger pulley 153 which is rotated at high speed by the air motor 155 or other suitable motor. Preferably the air motor 155 operates at two thousand r.p.m. or higher speeds so as to rotate the container 26 through the sleeve 133 at speeds of from thirty-one fifty to four thousand r.p.m. The pulley 153 may have an effective diameter of two and three-quarter inches while the pulley groove 149 may have an effective diameter of one and three-quarter inches. However, any desired ratio may be used to obtain the desired rate of rotation of the container 26. It should be noted that the head 84 remains stationary.

The No. 1 paint, such as white paint, under control of the solenoid valve S12, is pumped by a pump 189 under pressure to the inlet 46 and through passages 48, 50, 52, 70, 72, 74, 82, 90 and 92 from which the paint is delivered beneath the rim 94 into the container 26. When it is desired to cease painting with this particular paint, the valve 54 in the block 44 is closed by the application of air pressure from the air supply conduit 309 through the three way solenoid valve S10 to the connection 56. Thereafter, air pressure is exhausted under control of the three way solenoid valve S21 to the exhaust conduit 311 from a connection 157 which opens the thinner and air valve 159. This thinner and air valve 159 is similar in construction to the valve 54 and the other valves in the block 44. The remaining valve in the block 44 at this time remain in the closed position by the application of air pressure. During the opening of the valve 159, the solenoid valve S14 is opened for five seconds to supply thinner through the connection 161 connecting with the U-shaped connection 163 passing through the diaphragm chamber of the valve 159 and connecting with the passage 165 which in turn connects through the passages 70, 72 and 74 as well as the passage 82, with the passages 90 and 92 in the head 84 which discharge the thinner and air onto the interior of the revolving paint delivery container 26. This flushes out these passages in the block 44 of the No. 1 paint which has been supplied through the connection 74. Immediately thereafter, the solenoid valve S13 is opened for ten seconds to blow dry the passages and the container 26. The valve S9 is normally closed and the valve S12 is normally open during the use of the No. 1 paint. Normally, the pump 189 will not require flushing. Should flushing of the pump 189 be desired, the valve S12 is closed and the valve S9 is opened to supply first thinner briefly and then air to the pump 189. The U-shaped valve passage 52 is also opened and the valves 159, 169 and 183 are closed during this flushing.

After the system of passages used by the No. 1 paint has been flushed out and dried with thinner and air, the system may now be used to deliver another paint which may be of various selected colors. The paint of various selected colors, selected by opening any one of the valves 193, 195 and 197, is pumped by the pump 199 through the connection 171 and the passages 173 and 175. If these passages have previously been used for another color, they may be flushed out briefly by conecting the connection 167 through the three way solenoid valve S23 to the exhaust conduit 311 so as to open the valve 169 which causes the paint to be flushed out through the valve 169 and the passage 177 connecting with the discharge connection 179 connecting through the pipe 181 to a suitable drum 182 for collecting waste paint.

After the system of passages is flushed, the valve 159 and also the valve 169 and the valve 54 are closed while a fourth valve 183 is opened by operating the three way solenoid valve S20 to connect with the exhaust conduit 311 for exhausting the pipe 185 connecting with the fitting 187. This allows the No. 2 (color) paint supply to flow from the passage 175 through the diaphragm chamber of the valve 183 to the passage 70 and thence through the passages 72 and 74, up through the paint delivery passage 82, through the paint delivery passages 90, 92 and 96 in the paint delivery head 84 to the paint delivery container 26. This paint flow continues in this manner as long as this particular paint is desired to be used. After any stoppage of paint flow, the valve 159 is automatically opened briefly to flush out the passages as before. During this time the remainder of the valves are kept closed.

Should a change in color be desired for supply through the connection 171, all of the valves 193, 195 and 197 are closed and then the valve 183 is first kept closed and the valve 169 is opened while the passages 173 and 175 are cleared of the previously used color by first opening a thinner valve 220 briefly and then briefly opening an air valve 222. Thereafter, another color of paint is supplied through the connection 171. The valve 169 is then closed and the valve 183 is opened when it is desired to supply the second color of paint to the paint container 26. However, between any change of paint or any stoppage of paint flow, the valve 159 should be opened by the energization of the solenoid valve S21 and the remainder of the valves closed and then the valve S13 is energized and opened for five seconds and thereafter the valve S14 is energized and opened for ten seconds so as to circulate a supply of thinner and air through the passages 165, 70, 72 and 74 as well as the passage 82 and the passages in the head 84 and the cone and the container 26 itself to clean away the previously used paint so as to provide a fresh clean surface for the next paint to be used. As many colored paints as may be desired may be connected to the connection 171 at various times. The connection 46 will generally be used for a single paint supply, such as white paint. The color paint system normally will be changed when required while the white paint (No. 1) system is used in white painting so as to minimize the time the system is idle during changes in color.

Figure 9:
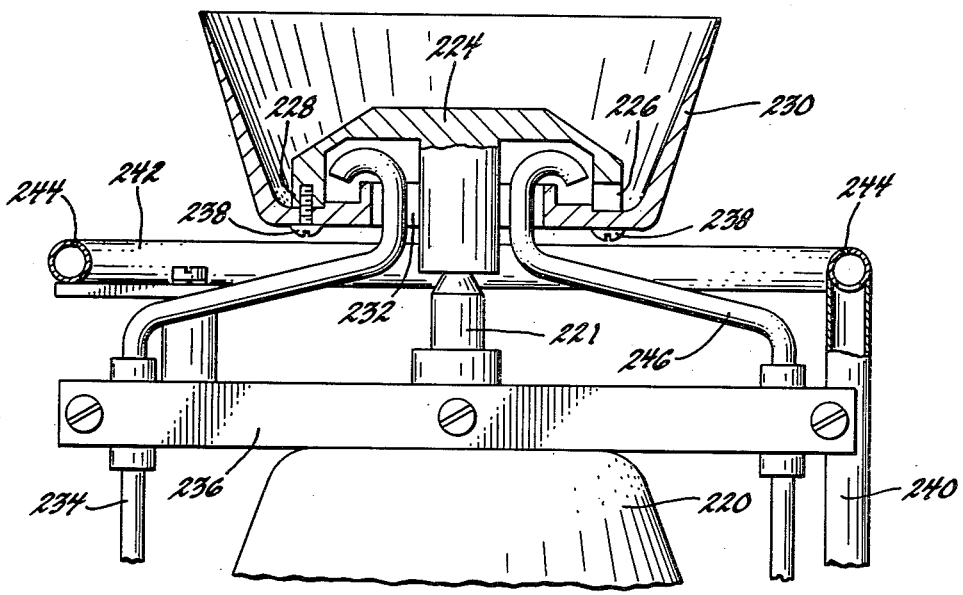
FIGURE 9 is a view partly in elevation and partly in vertical section showing a modified form of paint spraying apparatus.

In FIGURE 9 is a modified form of the invention which is especially suitable for ground coats. In this form, the air motor 220 through the shaft 221 rotates a cap-shaped paint delivery head 224 having a downwardly turned rim 226 spaced by the projections 228 from the bottom of the paint container coating device 230. This paint delivery container has an inner or central opening 232 provided with an upturned rim. The paint is delivered through a paint delivery tube 234 supported by a bracket 236 connected to the motor 220. The upper portion of this tube 234 extends through and over the rim of the opening 232 and is downwardly turned into the bottom of the paint delivery container 230 surrounding the opening 232 and its rim. This supplies paint to the bottom of the container 230. The rotation of the container 230 causes the centrifugal force to be applied to the paint which causes it to flow upwardly and to be thrown outwardly as a fine spray from the rim of the container 230. The container 230 is about four to eight inches in diameter and is rotated at about four thousand to five thousand five hundred r.p.m. The container 230 is fastened to the projections 228 by the screws 238 so that the head 224 and the container 230 rotate in unison.

To direct the pattern of spray of the paint from the container 230, there is provided an air supply tube 240 ending in a ring-shaped portion 242 having small apertures 244 therein at desired points which impinge against the spray centrifuged over the rim of the container 230 in a fine mist so as to direct the spray in the direction of the air blast from the outlets 244. These outlets can be grouped and directed in such a manner that the spray pattern may be changed so as to produce substantially any form of pattern desired. It can best be used to insure the uniform coating of irregular objects and to direct the spray into crevices or openings as desired.

For cleaning purposes, there is provided a second pipe 246 also supported by the bracket 236 extending upwardly through the opening 232 and over the rim surrounding the opening and discharging outside the rim of the opening 232 into the bottom of the paint container 230. After this paint supply is shut off from the tube 234, a liquid solvent or thinner is first supplied through the tube 246 to the container 230 to flush any paint out of the container 230 and the head 224 for about ten seconds. Thereafter, a blast of air is passed through the tube 246 for about ten seconds to flush away the thinner and dry the head and container to insure that the container 230 and the head 244 are clean for subsequent painting operations. This form of paint spraying coating apparatus may be substituted for the paint spraying coating apparatus shown in FIGURE 1. It may be controlled by the system shown in FIGURES 10A and 10B. The container 230 may be substituted for either of the containers 26 or 28 and, for the driving apparatus that is designated by the reference characters 30 and 31, there may be substituted the apparatus shown in FIGURE 9. The high voltage supply 34 will be similarly connected for electrostatically charging the paint.

As shown particularly in FIGURE 10A and also in some of the remaining figures, an automatic control system is provided for flushing the paint spray coating apparatus whenever there is any interruption in the presentation of cabinets for as long as two minutes. Also, should the conveyor stop, the system will be flushed after an interruption of two minutes.

The Height Control

Figure 8:
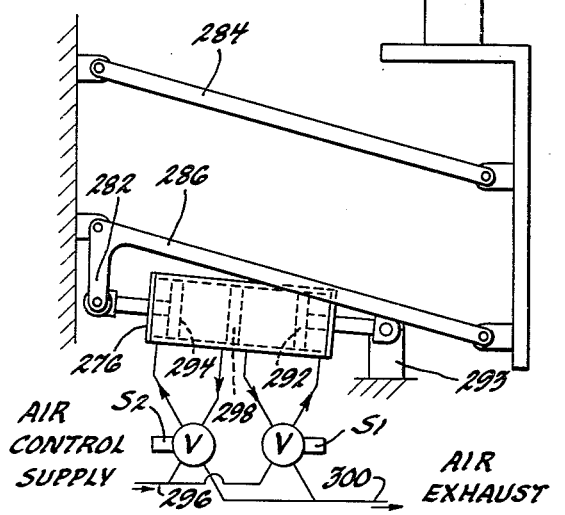
FIGURE 8 is a view partly in elevation and partly diagrammatic showing apparatus for raising and lowering the paint spraying apparatus.
Figure 10B:
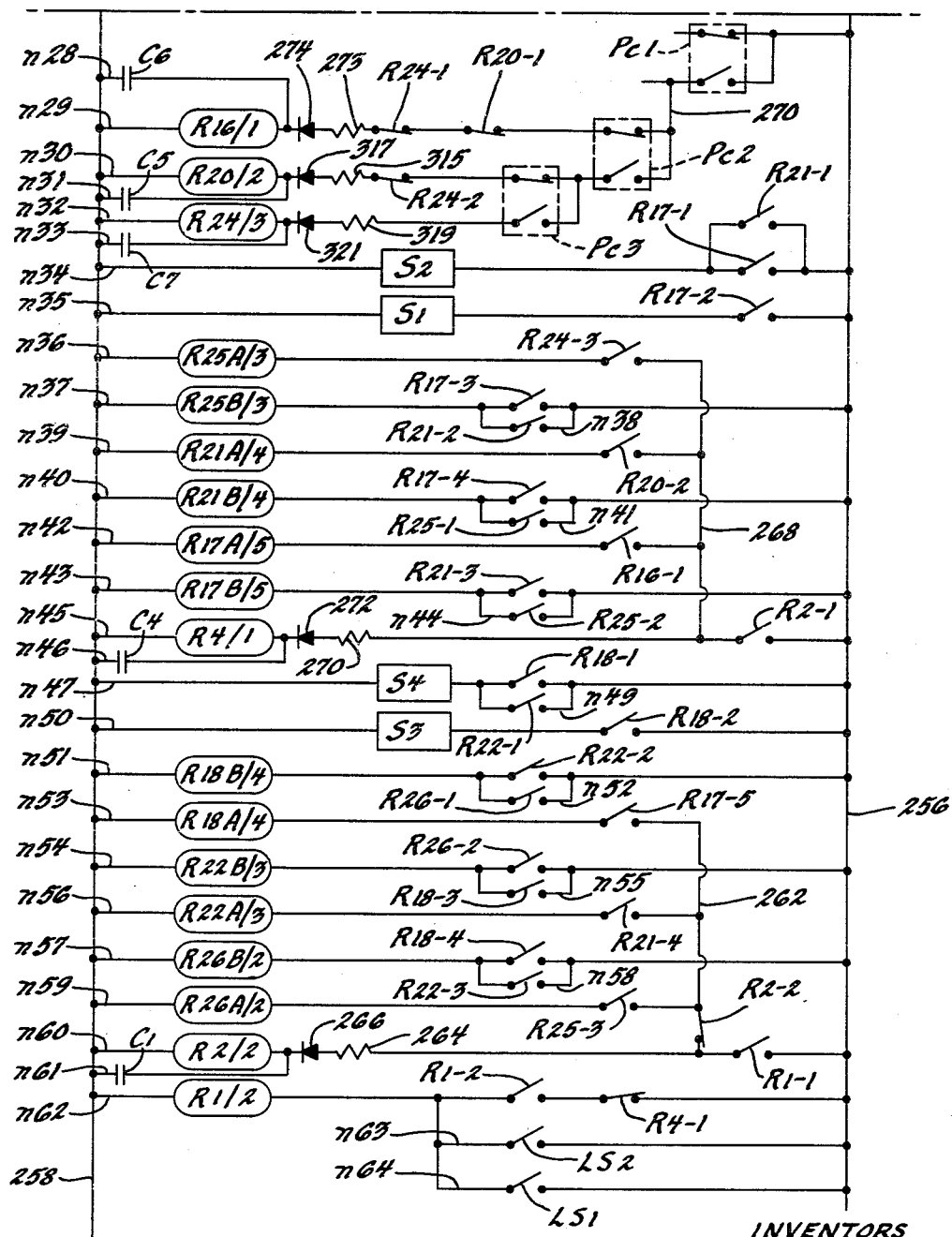

A further automatic control, illustrated principally in FIGURES 1, 8 and 10B, is the adjusting of the height of the paint coating containers 26 and 28 according to the length of the cabinets 24, 24′ and 24″. For this purpose, as shown in FIGURE 1, there are provided three light sources operating constantly, designed by 250, 252 and 254. The light beam from the light source 250 normally falls upon a photo cell PC1 while the light from the light sources 252 and 254 normally fall, respectively, upon the photo cell PC2 and PC3. The short cabinets 24 will obstruct the transmission of light from the light source 250 to the photo cell PC1 for the length of time it takes the conveyor to move a cabinet through the light beam but will not interfere with the transmission of light to the photo cells PC2 and PC3. The movement of the medium length cabinet 24′ being of medium length will obstruct the transmission of light from both of the light sources 250 and 252 to the photo cells PC1 and PC2 for a similar length of time. The long cabinet 24″ will obstruct the transmission of light from all three light sources 250, 252 and 254 to the photo cells PC1, PC2 and PC3 for a similar length of time. Through this photo cell arrangement, the sizes of the cabinets are measured.

In FIGURE 1, the conveyor 20 is provided limit switches LS1 and LS2 located four feet apart. Limit switch LS1 is located two feet, ten inches, in advance of the center of the paint spray container 26. Photo cell PC1 is located six inches in advance of limit switch LS1. Photo cells PC2 and PC3 are each located two inches in advance of PC1 and each other to minimize any difficulties such as might occur should any of the cabinets swing or oscillate with their hangers 22 as suspended from the conveyor. The photo cell PC1 is located seven inches above photo cell PC2 while photo cell PC3 is located six inches below photo cell PC2.

Each time a cabinet hanger 22 passes the limit switch LS1, this switch will be closed. Also, each time a cabinet hanger 22 passes limit switch LS2, this limit switch LS2 will be closed. As shown on FIGURE 10B, the closing of either of these limit switches (lines $n63$ or $n64$) will connect the supply conductor 256 to one terminal of the relay R1/2, the other side of which is connected to the supply conductor 258. The designation of the relay R1/2 means relay R1 operates 2 contacts. This system is used throughout FIGURES 10A and 10B as indicated upon the keys. As shown at the top of FIGURE 10A, the supply conductor 256 is connected to the right end terminal of a step-down transformer 260 while the supply conductor 258 is connected to the center terminal of the transformer 260. The transformer 260 receives a supply of 440 volts and steps the supply down to 110 volts between the center terminal and either of the end terminals. For convenience in location, the various circuits and lines in the wiring diagram, FIGURES 10A and 10B, are designated by "$n$" followed by a number to designate the approximate location. These numbers are placed along the left margin of these figures.

The relay R1/2 is therefor energized every time one of the hangers 22 contacts either or both of the limit switches LS1 and LS2. This energization, however, is brief. The energization of this relay R1/2 causes the closing of the switch members R1–2 and R1–1 (lines $n62$, $n61$). The closing of the contact R1–2 in line $n62$ whenever normally closed switch R4–1 is closed shunts the limit switch contacts LS2 and LS1 so that continuation of the energization of the relay R1/2 is not dependent upon the limit switches LS1 and LS2. This closing of the switch R1–2, therefore, continues the energization of the relay R1/2 and the closing of the switch R1–1 in line $n60$ provides a connection between the supply conductor 256 through a normally closed contact R2–2 with a conductor 262. This energization of the conductor 262 continues for a fraction of a second providing a pulse of energy as explained in the following paragraph.

While the relay contact R1–1 is closed, current flows through the relay R2/2. This relay, however, has between it and the switch R1–1 a resistance 264 and a rectifier 266. In parallel with the relay R2/2 is a capacitor C1. Through this arrangement, the closing of the switch R1–1 not only energizes the relay R2/2 but also energizes or charges the capacitor C1 to provide a slightly delayed action. The rectifier 266 insures the application of direct current to the capacitor C1 while the resistance 264 reduces the voltage applied to the relay R2/2 to compensate for the supply of direct current to the relay R2/2 instead of alternating current for which it was designed. The relay R2/2 when energized after the slight delay sufficient for the pulse of current to the conductor 262 opens the contacts R2–2 momentarily to deenergize the conductor 262 during the following cycle of events and also momentarily closes the switch contacts R2–1. This energizes the conductor 268 momentarily providing it with a pulse of energy and also thruogh the resistance 270 and the rectifier 272 momentarily energizes the relay R4/1 and the capacitor C4. The rectifier-capacitor system insures a short continuation of the energization of the relay R4/1 after the opening of its circuit. The relay R4/1 opens the contacts R4–1 in line $n62$ to deenergize the relay R1/2 to open the contacts R1–1 and R1–2 in lines $n60$ and $n62$. This stops the energization of the relay R2/2 except for the brief surge provided the capacitor C1 which will cause the reclosing of the switch R2–2 and the reopening of the switch R2–1. No current, however, will be supplied to the conductor 262 as a result of the deenergization of the relay R2/2 because the switch R1–1 has been opened.

This particular cycle of events is repeated every time a hanger 22 operates and closes one of the limit switches LS1 or LS2 or both. This accomplishes first a momentary energization of the conductor 262 and then after this energization is terminated the conductor 268 is momentarily energized. This is accomplished by the sequence of events, since the closing of either of the limit switches LS1 or LS2 energizes the relay R1/2 to close the contacts R1–2 to continue the energization of the relay R1/2 and the closing of the contacts R1–1 which energize the relay R2/2. The energization of the relay R2–2 is delayed momentarily to permit a momentary pulse or application of current through the normally closed switch R2–2 to a conductor 262. However, as soon as the relay R2/2 becomes effective, it will momentarily open the contact R2–2 to terminate the energization of the conductor 262 and momentarily close the contact R2–1 in line n45 to energize momentarily the conductor 268. The relay R4/1 after each momentary delay will open the contacts R4–1 in line n62 to deenergize the relay R1/2 to reopen the contacts R1–2 and R1–1 to stop this peculiar energization cycle.

The purpose of this peculiar cycle is to control the vertical position of the paint containers 26 and 28. This raising and lowering is controlled by the photo cells PC1, PC2 and PC3. The photo cell PC1 is connected to the supply conductor 256. In the absence of any cabinet on the conveyor, the photo cells PC1, PC2 and PC3 will have their contacts in their normal positions shown in FIGURE 10B. The photo cell PC1 will therefore not supply any energy to the relay R16/1 when no cabinet cuts the light beam to photo cell PC1. When any cabinet 24, 24' or 24" cuts off the light beam from the light source 250 to the photo cell PC1, its normally open contact is connected by a conductor 270 to the photo cell PC2. If the cabinet is a short cabinet like cabinet 24, the light beam from the sources 252 and 254 will continue upon photo cells PC2 and PC3. The normally closed contact of the photo cell PC2 connects through relay contacts R20–1 and R24–1, a resistor 273 and a rectifier 274 with a relay R16/1 which is shunted by the capacitor C6 to provide the resistance-rectifier-capacitor arrangement insuring the prolonging of any energization of the relay R16/1. The normally open contact of photo cell PC1 will be closed for the length of time required for the entire cabinet to pass through the beam. This, therefore, will energize the relay R16/1 for a considerable period of time.

The energization of the relay R16/1 will close the contact R16–1 in line n42 to energize the relay R17A/5. This relay is a snap-action type relay. In this wiring diagram, all the snap-action relays have numbers followed by designations A and B in which the relay coil portion bearing the designation A is the actuating relay while the relay having the designation B after its number is the coil which releases or returns the relay contacts to their original position. The energization of relay coil R17A/5 causes the closing of the contacts R17–1 and R17–2 in lines n34 and n35 to energize the solenoids S1 and S2. This also causes the closing of the switch contacts R17–3 and R17–4 in lines n37 and n40 to energize the relay coils R25B/3 and R21B/4 so as to insure the return of the relays R25 and R21 to their normal positions. In addition, the energization of relay coil R17A/5 closes the contact R17–5 in line n53. This causes the energization of relay coil R18A/4 causing the closing of the relay contacts R18–1 in line n47 and R18–2 in line n50 to energize the solenoids S4 and S3. In addition, relay coil R18A/4 causes the closing of the contacts R18–3 in line n55 and R18–4 in line n57 to energize the relay coils R22B/3 and R26B/2 to insure that the relays R26 and R22 are in their normal positions.

The energization of the solenoids S1, S2, S3 and S4, as shown in FIGURE 1, supplies air from a supply line 296 under high pressure to both ends of each of the cylinders 276, 278 and causes the two pistons 292, 294 in each of the cylinders 276 and 278 to move to the center of their respective cylinders so as to provide the extreme contraction of the piston rod linkage of these cylinders between the anchorage 293 and the bell crank arms 280, 282 so as to raise the parallel arms 284, 286, 288 and 290 and the paint spray apparatus 30 and 31 to the maximum height, placing the containers 26, 28 about ten inches below the bottom of the short cabinet 24. The solenoids S1, S2, S3 and S4 control four way valves which simulta-
neously connect the central ends of the chambers within the pistons to an air exhaust 300. Each of the cylinders 276, 278 is divided by a central partition 298. The energization of the solenoids S1, S2, S3 and S4 only continues while a short cabinet is only obstructing the light beam from reaching photo cell PC1. This insures that the upward and downward movement of the paint spray containers 26 and 28 will only take place when there are no cabinets directly above either to prevent the engagement of the bottom of a long cabinet when it is followed by a short cabinet. This raising and lowering is also subject to the control by the limit switches LS1 and LS2 which control the pulses of energy supplied to the conductors 262 and 268. The relative location of the photo cells, the limit switches and the spray heads prevent the paint containers from striking the preceding cabinet during this change.

When a cabinet 24' of medium length passes through the light beam arrangement and interrupts the light from the light sources 250 and 252 to prevent the light from falling on the photo cells PC1 and PC2, the normally open contacts of photo cells PC1 and PC2 will be closed and their normally closed contacts will be opened during the time that the cabinet passes through the light beam. This action of the photo cells PC1 and PC2 causes the energization of the relay R20/2 and at the same time insures the deenergization of the relay R16/1 for the same period, since this energization of the relay coil R20/2 causes the opening of the contact R20–1 in line n29. This energization of the relay R20/2 under control of the resistance 315 and the rectifier 317 also causes the closing of the contact R20–2 in line n39.

This closing of the contact R20–2 makes it possible for the relay R21A/4 to be energized upon the energization of the conductor 268 causing the closing of contacts R21–1 in line n32, R21–2 in line n38, R21–3 in line n43 and R21–4 in line n56. This will not take place, however, until there is a timed momentary energization of the conductor 268 as a result of the closing of either of the limit switches LS1 or LS2. The closing of the relay contacts R21–1 in line n32 causes the energization of the solenoid valve S2 in line n34. This supplies air under pressure into the left end of the cylinder 276 to act upon the outer face of the piston 294 while the air on the opposite side is exhausted to move or keep the piston 294 to or in its central position. The solenoid valve S1, however, will not be energized so that the right outer end of the cylinder 276 will be connected to the air exhaust 300. This will cause the paint container 26 to be moved downwardly to the medium position in which it will be about ten inches below the bottom of the medium size cabinet 24'. The concurrent closing of the relay contact R21–2 energizes the relay coil R25B/3 causing the opening of the contacts R25–1 in line n41, R25–2 in line n44 and the contact R25–3 in line n59 if these contacts have been in the closed position because of the previous energization of the relay R25A/3. The concurrent closing of the contact R21–3 in line n43 will energize the relay coil R17B/5 which will open or insure the opening of the contact R17–1 in line n34, the contact R17–2 in line n35, the contact R17–3 in line n37, the contact R17–4 in line n40 and the contact R17–5 in line n53. The closing of the contact R21–4 in line n56 will make it possible for the relay R22A/3 to be energized upon the next pulse or next momentary energization of the conductor 262. This, of course, depends upon the closing of either the limit switches LS1 or LS2 as previously described.

When the conductor 262 is momentarily energized to energize through contact R21–4, the relay R22A/3, the switch R22–1 in line n49 will close to energize the solenoid S4 to cause air to be applied to the left end of the cylinder 278 which is sufficient to insure the holding of the paint container 28 at the medium height for the cabinet 24' of medium length. The solenoid S3, however, is not energized so that air will not be applied to the opposite end of the cylinder 278 and instead this end of the cylinder will be connected to the air exhaust 300 in the manner similar to that shown for the other paint container arrangement in FIGURE 8 so that the paint container 28 will be moved to the medium position. The relay coil R22A/3 also closes the contacts R22–2 to energize the relay coil R18B/4 to insure that the relay R18A/4 is returned to its normal position in which the contacts R18–1, R18–2, R18–3 and R18–4 are returned to their open position. The relay R22A/3 also closes the contacts R22–3 in line n58 to energize the relay coil R26B/2 which will restore the relay R26A/2 to its normal position in which the contacts R26–1 and R26–2 are restored to the open position if not previously in that position. The use of this form of control insures that the paint containers 26 and 28 will remain at the height or level to which they have been positioned until another cabinet appears of a different height or length.

Should a long cabinet, such as 24", pass between the light sources 250, 252 and 254 and the photo cells PC1, PC2 and PC3, the photo cells PC1, PC2 and PC3 will be actuated to close their normally open contacts and to open their normally closed contacts shown in lines n26, n29 and n30. This will open the circuits to the relays R16/1 and R20/2. The relay R24/3, however, will be energized through the resistance 319 and the rectifier 321 to open contacts R24/1 to insure the deenergization of the relay R16/1 and to open the contact R24–2 to insure the deenergization of the relay R20/2. In addition, the contacts R24–3 in line n36 will be closed to prepare for the energization of the relay R25A/3 upon the next energization of the conductor 268. The limit switches LS1 and LS2 are arranged so that the conductors 262 and 268 are energized during the time a cabinet normally passes between the light source 250 and the photo cell PC1.

When the relay R25A/3 is energized by the closing of the contacts R24–3 and the energization of the conductor 268, the contact R25–1 in line n41 will be closed to energize the relay coil R21B/4 to restore the relay R21A/4 to its normal position if it is not in its normal position to open or insure the opening of the contacts R21–1 in line n32, R21–2 in line n38, R21–3 in line n43 and R21–4 in line n56. At the same time, a contact R25–2 is closed to energize the relay coil R17B/5 which will return the relay R17A/5 to its normal position to open or insure the opening of the contacts R17–1 in line n34, R17–2 in line n35, R17–3 in line n37, R17–4 in line n40 and R17–5 in line n53. Also, at the same time, the relay contact R25–3 in line n59 is closed to energize the relay R26A/2 thus causing the closing of the contact R26–1 in line n52 to energize the relay coil R18B/4 to restore to its normal position the relay R18A/4 if it is not already in such position to open or insure the opening of the relay contacts R18–1 in line n47, R18–2 in line n50, R18–3 in line n55 and R18–4 in line n57. Also closed at this time is the relay contact R26–2 in line n54 which energizes the relay coil R22B/3 which will return to normal if it is not already in that position, the relay coil R22A/3 which will insure the opening of the contacts R22–1 in line n49, R22–2 in line n51 and R22–3 in line n58. As a result of these switching operations, solenoid valves S1, S2, S3 and S4 will be deenergized. This will connect the outer end portions of both cylinders 276 and 278 to the air exhaust thereby lowering the paint containers 26 and 28 to their lowest position to maintain the proper distance of ten inches between these containers and the bottom of the long cabinets 24". Thus, by this integrally related system, the paint containers 26 and 28 are raised and lowered at the proper time in accordance with the length of the cabinets which pass between the light sources and the photo cells.

*The Paint Control*

The double throw switch 305 in line n15 determines whether white or No. 1 paint coating material or the No. 2 or color paint coating material is to be supplied to the spray painting coating containers 26 and 28. In the upper position of this double throw switch 305, the solenoids S12 and S18 will be energized to supply the No. 1 or white paint, while in the lower position, the solenoids S26 and S27 will be energized to supply the No. 2 or color paint.

For the purpose of showing its relationship to the paint shut-off and automatic flushing system, the photo cell PC1 is also shown on FIGURE 10A. The normally open contact of photo cell PC1 is also connected to the relay R28/3 in line n27. The passage of any cabinet between the light source 250 and the photo cell PC1 closes this normally open contact and energizes this relay R28/3 and thus causes the closing of contact R28–1 and the opening of contact R28–2 in lines n23 and n24. In addition, this energization causes the brief opening of the contact R28–3 located between lines n25 and n26. This action takes place only during the time it requires a cabinet to pass through the light beam between the light source 250 and photo cell PC1. FIGURE 10A also includes a separate circuit which includes a manual switch 303, a relay contact R13–1, a motor 21 which drives or operates the conveyor 20 and a relay R3/4. Obviously, if the conveyor 20 is stopped by the deenergization of the motor 21 through the opening of switches 303 or R13–1, the relay R3/4 will also be deenergized causing the closing of the contact R3–1 in line n23, the opening of the contact R3–2 in line n24, the opening of the contact R3–3 in line n25 and the opening of the contact R3–4 in line n18.

During normal operation the switch R37–1 will be open and the switch R37–2 will be closed concurrent with the operation of the ventilating system and switch R33–2 will remain closed. This energizes the relay R9A/1 which is a snap action relay which will move and hold the switch contact R9–1 in line n15 in the closed position to complete the energization of either the white paint solenoids S18 and S12 or the colored paint solenoids S26 and S27 depending upon the position of the selector switch 305. Also energized during normal operation because of the normally closed position of the switches R11–3 and R15–2 is the relay R29/1 in line n9. This energization of this relay R29/1 keeps the contact R29–1 in line 26 open to prevent the normal energization of the relay R13–1. During normal operation of the conveyor, the conveyor motor 21 and the relay R3/4 are energized to close the contact R3–1 in lines n23 and to open the contacts R3–2 and R3–3 in lines n24 and n25 and to open the contact R3–4 in line n18.

The relay R8/1 is a bimetal time relay which requires a full two minute energization before it actually operates its contact R8–1. It normally receives energization through the normally closed contact R28–3 and the normally closed contacts R30–1, R36–1 and R33–1 as well as the contact R7–2. As long as there are cabinets, such as cabinet 24, 24' or 24", upon the hangers 22 of the conveyor 20, the photo cell PC1 will be closed at intervals of less than two minutes to frequently and intermittently energize the relay R28/3 to intermittently open the contact R28–3 to intermittently deenergize the relay R8/1 at intervals of less than two minutes to prevent the operation of the relay R8–1 and particularly to prevent the closing of its contact R8/1 in line n21. The contact R28–1 will be closed and R28–2 will be opened intermittently but this will not at this time cause or affect any energization since the switch R7–1 is normally open.

In the absence of any cabinets upon the hangers 22 of the conveyor 20, the normally open contact of photo cell PC1 will remain open and the relay R28/3 will remain deenergized. Should this condition persist for two minutes, the bimetal time relay R8/1 will be energized for a corresponding period of two minutes to finally cause its operation. Should the conveyor motor 21 and the relay R3/4 be deenergized for more than two minutes, the closing of the contact R3–3 will energize the relay R8/1 for a corresponding period to cause its operation. When the bimetal time relay R8/1 operates, it will close the contact (n22) providing an energization for the conductor 307. This energizes a number of branch conductors and it, in particular, first energizes the relay R7/2 in line n23 causing the opening of the contact R7–2 in line n25 to deenergize the bimetal relay R8/1 permitting it to cool off for subsequent reopening of the switch R8–1. Relay R7/2 also closes the contact R7–1 in line n23 completing a circuit from the conductor 256 through the switch R3–1, the contact R28–2 and the switch R7–1 to the conductor 307 to continue the supply of current to the conductor 307 and its connections after the switch contact R8–1 opens. The closing of this switch R7–1 in effect locks or connects the conductor 307 to the conductor 256 to provide energization throughout the flush period.

The consequent energization of the relay R6/2 in line n21 causes the closing of the switch contact R6–1 in line n19 to energize the reopening coil R9B/1 in line n19 to cause the opening movement of the snap acting relay R9A/1 while switch contact R6–2 is open to reopen the contact R9–1 to deenergize the circuit of line n15 to deenergize the solenoids S12, S18 or S26, S27 in lines n14 to n18. This will stop the flow of paint to the paint containers 26 and 28. The energization of the solenoid S10 causes it to connect the air pressure line 309 with the valve actuating mechanism 54 to close the U-shaped passage 52 to shut off the No. 1 or white paint inlet conduits 48 and 50 when the switch 305 is in its upper position. The energization of the three way solenoid valve S21 causes the connection of the exhaust line 311 with the thinner and air valve 159 to open it to the flush inlet 161. The energization of the solenoids S10 and S21, therefore, shuts off the No. 1 white paint from the block 44 and opens the block 44 to the flushing operation. A similar mission is accomplished by the solenoids S16 and S22 for the apparatus supplying the containers 28.

Since the contact R12–1 in line n8 is normally closed, the relay coil R11/4 is also immediately energized. This will open the contact R11–1 in line n3 to prevent the immediate energization of the relay coil R15/3. This energization of relay coil R11/4 also opens the contact R11–2 in line n4 to prevent the immediate energization of the bimetal relay R14/1. In addition, the contact R11–3 in line n9 is immediately opened to deenergize the relay coil R29/1 which will cause the reclosing of the contact R29–1 in line n26 to prepare the relay R13/1 for energization upon any closing of the normally open contact of the photo cell PC1. However, the photo cell PC1 will only close its normally open contact upon the presentation of a cabinet by the conveyor. Should a cabinet be presented by the conveyor, the closing of the normally open contact of photo cell PC1 during the flushing operation will cause the energization of the relay R13/1 to open the contact R13–1 in series with the switch 303 and the motor 21 of the conveyor circuit to deenergize both the conveyor motor 21 and the relay R3/4. This will stop the conveyor 20 and prevent the movement of the cabinet over the spray painting containers 26 and 28 while the flushing is in progress.

The relay coil R11/4 also closes the relay contact R11–4 in line n11 to energize the solenoid valves S14 (illustrated in FIGURE 3) and S20 (the corresponding valve for the paint container 28) to supply thinner to the inlet 161 for five seconds. This five second interval is determined by the bimetal time delay relay R12/1 in line n5 which is energized through the transformer 313 which is energized from the conductor 307. This transformer 313 energizes the small low voltage circuit which includes the bimetal time delay relays R12/1 and R14/1. The relay R14/1 is deenergized by the opening of the relay contact R11–2 but the bimetal relay R12/1 is energized through- out the energization of the conductor 307 so that after five seconds it will open its contact R12–1 in line n8 to deenergize the relay R11/4. This will permit the reclosing of the contact R11–1 to permit the energization of the relay coil R15/3 and also will accomplish the reclosing of the contact R11–2 to permit the energization of the bimetal relay R14/1. The contact R11–3 will also reclose but this will not be effective to energize relay R29/1 since the energization of the relay R15/3 will cause the opening of the normally closed contact R15–2 in line n9.

The closing of contact R11–3, however, is effective by the closing of the contact R15–1 to continue the energization of the conductor 307 to insure the completion of the flushing operation regardless of the entry of a cabinet into the light beam as previously mentioned. This is desirable because the deenergization of the relay R3/4 by the opening of the contact R13–1 causes the contact R3–1 to reopen and the contact R3–2 to reclose, thus momentarily deenergizing the relay R6/2 to reopen the contact R6–1 to deenergize the relay contact R9B/1 and to reclose the contact R6–2 to reenergize the relay R9A/1 to restart the paint flow and also to momentarily deenergize the relay R7/2 to reopen the contact R7–1 in line n23 which will prevent the conductor 307 from being energized through this lock circuit. This will also accomplish the reclosing of the contact R7–2 in line n25. This will accomplish the reenergization of this relay R8/1 but this is not important at this time since its delay of two minutes before operating will not permit it to operate before the completion of the flushing. The holding of the cabinet in the light beam will keep the normally open contact of the photo cell PC1 closed since the conveyor is stopped with a cabinet in the upper light beam by the opening of the contact R13–1 keeping the conveyor motor 21 deenergized.

Figure 3:
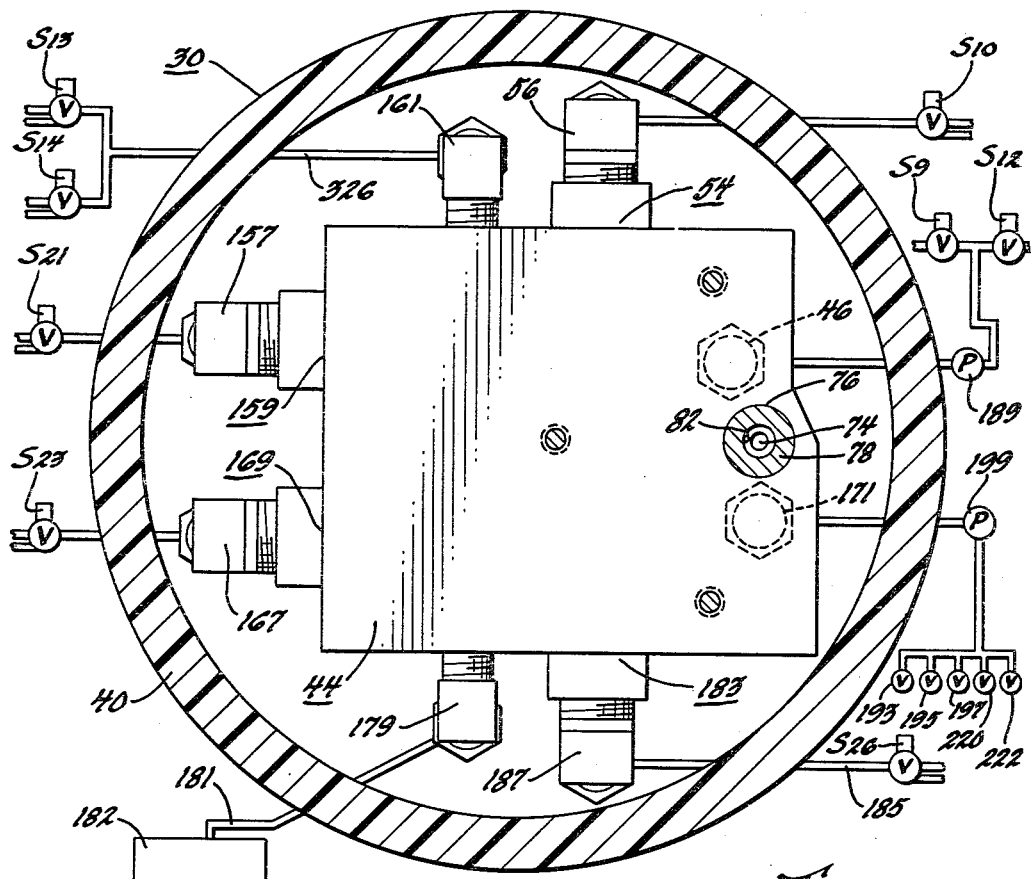
FIGURE 3 is a horizontal sectional view taken along the line 3—3 of FIGURE 2.
Figure 4:
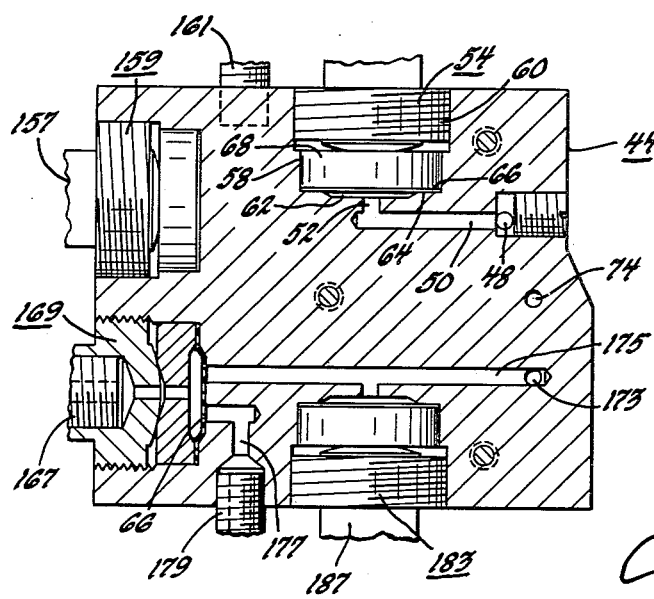
FIGURE 4 is a fragmentary horizontal sectional view taken along the line 4—4 of FIGURES 2 and 6.
Figure 5:
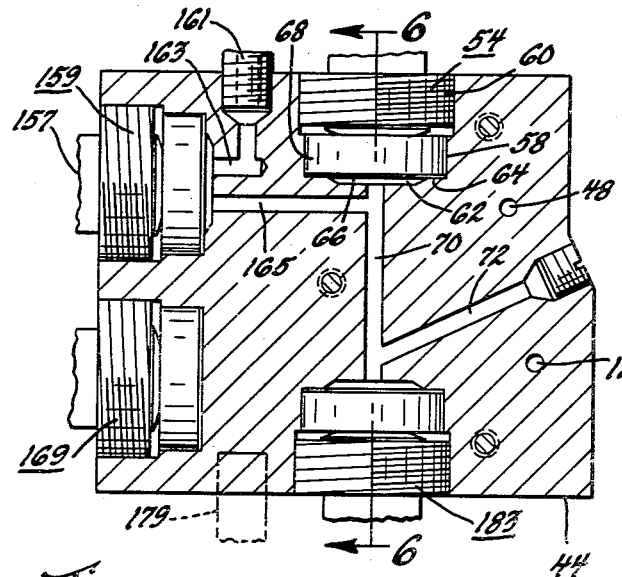
FIGURE 5 is a fragmentary horizontal sectional view taken along the line 5—5 of FIGURES 2 and 6.
Figure 6:
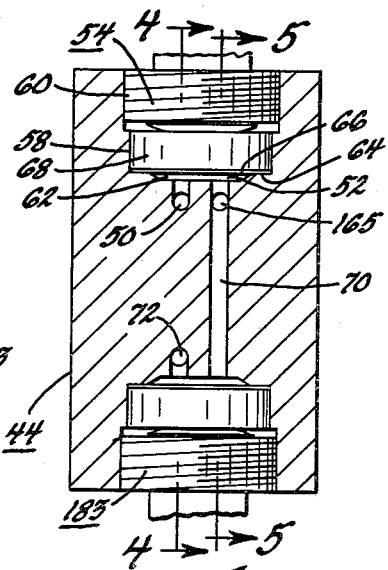
FIGURE 6 is a fragmentary vertical sectional view taken along the line 6—6 of FIGURE 5.

The energization of the relay R15/3 also closes the contact R15–3 in line n12 to energize the solenoid valves S13 and S19 to supply air to the flush inlet 161 of the block 44 and the corresponding flush inlet within the housing 31. The solenoid valve S13 is shown in FIGURE 3 connecting through the conduit 326 with the inlet 161 of the block 44. This supply of air flushes the thinner and dissolved paint from the passages in the block 44. This continues for the ten seconds required for the bimetal time delay relay R14/1 to operate which after ten seconds of energization opens the contact R14–1 in line n3 to deenergize the coil R15/3 to open the contacts R15–1 and R15–3 to prevent further energization of the conductor 307 and to close the solenoid air valves S13 and S19 to stop the flow of air to the block 44 and the corresponding block in the housing 31 and to the paint spray containers 26 and 28. In addition, the contact R15–2 in line n9 also recloses to reenergize the relay R29/1 to open the normally closed contact R29–1 in line n26 to cause the reclosing of the contact R13–1 to reenergize the conveyor motor 21 and the relay R3/4. The continued energization of the bimetal relay R12/1 keeps the contact R12–1 in line n8 open to prevent immediate repetition of the flush cycle.

Should a cabinet obstruct the light beam to the photo cell PC1 during any time that the relay R15/3 is energized, the relay R13/1 will be energized through the normally closed contact R29–1 in line n26 to open the contact R13–1 in the circuit to the conveyor motor 21. This will prevent operation of the conveyor at this time and will also deenergize the relay R3/4. The conveyor would then remain stopped until the relay R15/3 was deenergized by the operation of the bimetal relay R14/1 to open the contact R14–1 in line n3. The contact R15–2 subsequently will reclose to reenergize the relay R29/1 to reopen the contact R29–1 in line n26. This will deenergize the relay R13/1 to reclose the contact R13–1 in the conveyor circuit to reenergize the conveyor motor 21 and the relay R3/4. The reenergization of the relay R3/4 will open the contact R3–4 in line n18 and the contacts R3–3 and R3–2 in lines n25 and n24, the latter briefly deenergizing the conductor 307 particularly to deenergize briefly the relay R7/2 to open the contact R7–1 in line n23 and to close the contact R7–2 in line n25 to prevent further energization of the conductor 307 until a new flush period operation is called for. The reclosing of the contact R3–1 under the reenergization of the relay R3/4 follows the opening of the contact R3–2 so as to provide sufficient time for the relay R7/2 to be deenergized to open the locking switch R7–1 to assure this deenergization of the conductor 307. Following this, the bimetal relay R12/1 will reclose the contact R12–1 in line n8 to prepare the flush system for call for another flush operation upon the absence of a continuous supply of cabinets or energization of the conveyor motor 21 and the relay R3/4 for more than two minutes. The deenergization of the conductor 307 causes the deenergization of the relay R6/2 to cause the deenergization of the relay coil R9B/1 by the opening of the contact R6–1 and to cause the reenergization of the relay R9A/1 by the normal closing of the contact R6–2. This will cause the reenergization of the coil R9A/1 to cause the closing of the contact R9–1 in line n15 to reenergize the solenoid valves S12 and S13 if the double throw switch 305 is in its upper position or if switch 305 is in its lower position to reenergize the solenoid valves S26 and S27. Included in the scope of the word "paint" as used in the claims, is any form of liquid or vapor surface coating material for articles applied by any form of coating process if the process is not further specified.

While the embodiments of the present invention as herein disclosed, constitute preferred forms, it is to be understood that other forms might be adopted.

What is claimed is as follows:

1. In a coating system for articles moving along a path, a coating device, means responsive to the normal movement of the articles for supplying coating material to the coating device, and means responsive to an interruption of the normal movement for stopping the supply of coating material to said coating device and thereafter supplying liquid solvent and a gas in successive periods to the coating device.

2. In a coating system for articles including conveyor means for moving the articles one by one through a path, a coating device along the path located to coat the articles in succession, means for supplying coating material to said device, a time delayed operating means having a time delay period longer than the period of time a predetermined number of articles normally pass the coating device, said operating means having means responsive to the completion of said time delay period for shutting off said supply of coating material and flushing said coating device for a limited period, and means responsive to the presentation of articles by the conveyor means at intervals of time less than said time delay period for preventing the operation of said operating means.

3. In a coating system for articles including conveyor means for moving the articles one by one through a path, a coating device along the path located to coat the articles in succession, means for supplying coating material to said device, a time delayed operating means having a time delay period longer than the period of time a predetermined number of articles normally pass the coating device, said operating means having means responsive to the completion of said time delay period for shutting off said supply of coating material and flushing said coating device for a limited period, means responsive to the presentation of articles by the conveyor means at intervals of time less than said time delay period for preventing the operation of said operating means, and means responsive to the presentation of articles by the conveyor means and the flushing of said coating device for stopping said conveyor means during the flushing of said coating device.

4. In a coating system for articles including conveyor means for moving the articles one by one normally in a predetermined arrangement through a path, a coating device along the path located to apply a coating material upon the articles in succession, means for supplying coating material to said coating device, means responsive to the absence of a predetermined plurality of said articles from said predetermined arrangement for stopping the supply of coating material to said coating device, and time controlled means coincidentally responsive to said stopping means for flushing said coating device for a timed period.

5. In a coating system for articles including conveyor means for moving the articles one by one normally in a predetermined arrangement through a path, a coating device along the path located to apply a coating material upon the articles in succession, means for supplying coating material to said coating device, means responsive to the absence of a predetermined number of said articles from said predetermined arrangement for stopping the supply of coating material to said coating device, means coincidentally responsive to said stopping means for flushing said coating device, and means responsive to the presentation of an article following said absence during the flushing of said coating device for stopping said conveyor means.

6. In a coating system for articles including conveyor means for moving the articles one by one normally in a predetermined arrangement through a path, a coating device along the path located to apply a coating material upon the articles in succession, means including a snap acting relay having an operating coil and a release coil for supplying coating material to the coating device, a time delay relay required to be energized for a predetermined period of time greater than the time required for the passage of one article past the coating device before it operates, means controlled by said time delay relay for deenergizing said operating coil and energizing said release coil for stopping the supply of coating material, and means responsive to the absence of articles from said predetermined arrangement for energizing said time delay relay.

7. In a coating system for articles including conveyor means for moving the articles one by one normally in a predetermined arrangement through a path, a coating device along the path located to apply a coating material upon the articles in succession, means including a snap acting relay having an operating coil and a release coil for supplying coating material to the coating device, a time delay relay required to be energized for a predetermined period of time greater than the time required for the passage of one article past the coating device before it operates, means controlled by said time delay relay for deenergizing said operating coil and energizing said release coil for stopping the supply of coating material, and means responsive to the stopping of said conveyor means for energizing said time delay relay.

8. In a coating system for articles including conveyor means for moving the articles one by one normally in a predetermined arrangement through a path, a coating device along the path located to apply a coating material upon the articles in succession, means for supplying coating material to the coating device, a time delay relay required to be energized for a continuous period of time greater than the time required for the passage of one article past the coating device before it operates, means for supplying energy to said time delay relay, means responsive to the presentation by the conveyor means of each article for coating for interrupting the supply of energy to said time delay relay, and means responsive to the operation of said time delay relay for stopping the supplying of coating material to the coating device.

9. In a coating system for articles including conveyor means for moving the articles one by one normally in a predetermined arrangement through a path, a coating device along the path located to apply a coating material upon the articles in succession, means for supplying coating material to the coating device, a time delay relay required to be energized for a continuous period of time greater than the time required for the passage of one article past the coating device before it operates, means for supplying energy to said time delay relay, means responsive to the presentation by the conveyor means of each article for coating for interrupting the supply of energy to said time delay relay, means responsive to the operation of said time delay relay for stopping the supplying of coating material to the coating device, and means responsive to the operation of said time delay relay for interrupting its energization.

10. In a coating system for articles including conveyor means for moving the articles one by one normally in a predetermined arrangement through a path, a coating device along the path located to apply a coating material upon the articles in succession, means for supplying coating material to the coating device, a time delay relay required to be energized for a continuous period of time greater than the time required for the passage of one article past the coating device before it operates, means for supplying energy to said time delay relay, means responsive to the presentation by the conveyor means of each article for coating for interrupting the supply of energy to said time delay relay, means responsive to the operation of said time delay relay for stopping the supplying of coating material to the coating device, a second time delay relay energized in response to the operation of the first mentioned time delay relay, means for flushing the coating device in response to the operation of the first mentioned time delay relay, and means for stopping the flushing of said coating device in response to the operation of the second time delay relay.

11. In a coating system for articles including conveyor means for moving the articles one by one normally in a predetermined arrangement through a path, a coating device along the path located to apply a coating material upon the articles in succession, means for supplying coating material to the coating device, a time delay relay required to be energized for a continuous period of time greater than the time required for the passage of one article past the coating device before it operates, means for supplying energy to said time delay relay, means responsive to the presentation by the conveyor means of each article for coating for interrupting the supply of energy to said time delay relay, means responsive to the operation of said time delay relay for stopping the supplying of coating material to the coating device, a second time delay relay energized in response to the operation of the first mentioned time delay relay, means for supplying a solvent to said coating device in response to the operation of the first mentioned time delay relay, means for stopping the supplying of said solvent and for supplying a gas to said coating device in response to the operation of said second time delay relay, a third time delay relay energized in response to the operation of the second time delay relay, and means responsive to the operation of said third time delay relay for stopping the supplying of said gas to said coating device.

12. In a coating system for articles including conveyor means for moving the articles one by one normally in a predetermined arrangement through a path, a coating device along the path located to apply a coating material upon the articles in succession, means for supplying coating material to the coating device, a time delay relay required to be energized for a continuous period of time greater than the time required for the passage of one article past the coating device before it operates, means for supplying energy to said time delay relay, means responsive to the presentation by the conveyor means of each article for coating for interrupting the supply of energy to said time delay relay, means responsive to the operation of said time delay relay for stopping the supplying of coating material to the coating device, a second time delay relay energized in response to the operation of the first mentioned time delay relay, means for supplying a solvent to said coating device in response to the operation of the first mentioned time delay relay, means for stopping the supplying of said solvent and for supplying a gas to said coating device in response to the operation of said second time delay relay, a third time delay relay energized in response to the operation of the second time delay relay, and means responsive to the operation of said third time delay relay for stopping the supplying of said gas to said coating device, and means responsive to the operation of said first mentioned and second time delay relays and the presentation of an article adjacent said coating device by said conveyor means between the time of operation of said first mentioned and third time delay relays for stopping said conveyor means.

13. In a coating system for articles including conveyor means for moving the articles one by one normally in predetermined arrangement through a path, a coating device along the path located to apply a coating material upon the articles in succession, means for supplying coating material to the coating device, a time delay relay required to be energized for a continuous period of time greater than the time required for the passage of one article past the coating device before it operates, means for supplying energy to said time delay relay, means responsive to the presentation by the conveyor means of each article for coating for interrupting the supply of energy to said time delay relay, means responsive to the operation of said time delay relay for stopping the supplying of coating material to the coating device, a second time delay relay energized in response to the operation of the first mentioned time delay relay, means for flushing the coating device in response to the operation of the first mentioned time delay relay, means for stopping the flushing of said coating device in response to the operation of the second time delay relay, and means responsive coincidentally to the flushing of said coating device and the contemporaneous presentation of an article by the conveyor means adjacent said coating device for stopping said conveyor means.

References Cited in the file of this patent

UNITED STATES PATENTS

| | | |
|---|---|---|
| 2,048,912 | Ziska et al. | July 28, 1936 |
| 2,257,004 | Fleming | Sept. 23, 1941 |
| 2,362,926 | Porch | Nov. 14, 1944 |
| 2,467,989 | Porch | Apr. 19, 1949 |
| 2,509,448 | Ransburg et al. | May 30, 1950 |
| 2,564,392 | Burrucker | Aug. 14, 1951 |
| 2,736,671 | Ransburg et al. | Feb. 28, 1956 |
| 2,776,182 | Gunderson | Jan. 1, 1957 |
| 2,809,902 | Ransburg | Oct. 15, 1957 |
| 2,845,099 | Bailey | July 29, 1958 |
| 2,900,950 | Peeps | Aug. 25, 1959 |
| 2,930,721 | Tuthill | Mar. 29, 1960 |
| 2,955,568 | Blenman et al. | Oct. 11, 1960 |
| 2,966,880 | Gengenbach et al. | Jan. 3, 1961 |
| 3,011,472 | Kent et al. | Dec. 5, 1961 |

FOREIGN PATENTS

| | | |
|---|---|---|
| 658,687 | Great Britain | Oct. 10, 1951 |